US007875571B2

(12) United States Patent
Bogan, Jr. et al.

(10) Patent No.: US 7,875,571 B2
(45) Date of Patent: Jan. 25, 2011

(54) ACTIVATED MIXED METAL OXIDE OXIDATION CATALYSTS

(75) Inventors: Leonard Edward Bogan, Jr., Lansdale, PA (US); Ruozhi Song, Wilmington, DE (US)

(73) Assignee: Rohm and Haas Company, Philadelphia, PA (US)

( * ) Notice: Subject to any disclaimer, the term of this patent is extended or adjusted under 35 U.S.C. 154(b) by 603 days.

(21) Appl. No.: 11/894,242

(22) Filed: Aug. 20, 2007

(65) Prior Publication Data
US 2008/0064590 A1    Mar. 13, 2008

Related U.S. Application Data

(60) Provisional application No. 60/842,789, filed on Sep. 7, 2006.

(51) Int. Cl.
*B01J 23/00* (2006.01)
(52) U.S. Cl. ........................ 502/300; 502/305; 502/308; 502/311; 502/312; 502/313; 502/314; 502/319; 502/321; 502/325
(58) Field of Classification Search .......... 502/305–355
See application file for complete search history.

(56) References Cited

U.S. PATENT DOCUMENTS

| | | | |
|---|---|---|---|
| 5,422,328 A | 6/1995 | Ushikubo et al. | |
| 6,407,280 B1 | 6/2002 | Chaturvedi et al. | |
| 6,504,053 B1 | 1/2003 | Chaturvedi et al. | |
| 6,700,015 B2 | 3/2004 | Chaturvedi et al. | |
| 6,746,983 B2 * | 6/2004 | Gaffney et al. | 502/312 |
| 6,781,008 B2 | 8/2004 | Bogan, Jr. | |
| 6,790,988 B2 | 9/2004 | Chaturvedi et al. | |
| 6,825,380 B2 | 11/2004 | Chaturvedi et al. | |
| 7,015,173 B2 * | 3/2006 | Bogan et al. | 502/208 |
| 7,053,022 B2 * | 5/2006 | Gaffney et al. | 502/312 |
| 7,304,014 B2 * | 12/2007 | Cavalcanti et al. | 502/300 |
| 2002/0183198 A1 | 12/2002 | Gaffney et al. | |

FOREIGN PATENT DOCUMENTS

WO     WO 2005/000463     1/2005

OTHER PUBLICATIONS

Botella, et al., "Selective oxidative dehydrogenation of ethane on MoVTeNbo mixed metal oxide catalysts", J. Catalysis, vol. 225, No. 2, pp. 428-438 (2004).

* cited by examiner

*Primary Examiner*—Patricia L Hailey
(74) *Attorney, Agent, or Firm*—Kenneth Crimaldi

(57) ABSTRACT

A method for producing a catalyst by contacting a mixed metal oxide catalyst with water, and optionally, an aqueous metal oxide precursor to produce a modified mixed metal oxide, and calcining the modified mixed metal oxide.

10 Claims, No Drawings

ACTIVATED MIXED METAL OXIDE OXIDATION CATALYSTS

This application claims the benefit of priority under 35 U.S.C. §119(e) of U.S. Provisional Patent Application No. 60/842,789 filed on Sep. 7, 2006.

The present invention relates to mixed metal oxide oxidation catalysts which have been activated to improve selectivity.

Multi-metal oxide ("MMO") catalysts are well known for (amm)oxidation of alkanes and alkenes to unsaturated carboxylic acids or nitriles. For example, U.S. Pat. No. 6,407,280 discloses MMO catalysts containing Mo or W; V or Ce; Te, Sb or Se; as well as other metals, e.g., Nb, and promoted by at least one of Ni, Pd, Cu, Ag and Au. However, these catalysts produce byproducts that reduce yield and purity of the products, and so there is a need for oxidation catalysts with increased selectivity for production of unsaturated carboxylic acids or nitriles.

The problem addressed by this invention is to provide oxidation catalysts with increased selectivity for production of unsaturated carboxylic acids or nitriles.

STATEMENT OF THE INVENTION

The present invention provides a method for producing a catalyst by steps of: (a) providing a mixed metal oxide having the empirical formula

$$A_a V_b N_c X_d Z_e O_f$$

wherein A is at least one element selected from the group consisting of Mo and W, N is at least one element selected from the group consisting of Te and Sb, X is at least one element selected from the group consisting of Nb, Ta, Ti, Al, Zr, Cr, Mn, Fe, Ru, Co, Rh, Ni, Pt, Sb, Bi, B, In, As, Ge, Sn, Hf, Pb, P, Pm, Eu, Gd, Dy, Ho, Er, Tm, Yb and Lu, and Z is at least one element selected from the group consisting of Zn, Ga, Ir, Sm, Pd, Au, Ag, Cu, Sc, Y, Pr, Nd and Tb; and wherein, when a=1, b=0.01 to 1.0, c=0.01 to 1.0, d=0.01 to 1.0, e=0 to 0.1 and f is dependent on the oxidation state of the other elements; (b) contacting the mixed metal oxide with water comprising 0-3% of a metal oxide precursor, based on contained metal as a percentage of total weight of metals in the mixed metal oxide and the metal oxide precursor, to form a modified mixed metal oxide; wherein the metal oxide precursor comprises at least one of Nb, Mo, V, W, Zr, Ta and Bi; provided that, when 0% metal oxide precursor is present, the mixed metal oxide and water are heated to at least 60° C.; and (c) calcining the modified mixed metal oxide to form a calcined modified mixed metal oxide.

DETAILED DESCRIPTION OF THE INVENTION

Percentages are weight percentages, and temperatures are in ° C., unless specified otherwise. As used herein, the term "(meth)acrylic" refers to acrylic or methacrylic.

For the process of this invention, any mixed-metal oxide ("MMO") catalyst capable of oxidizing alkanes to unsaturated carboxylic acids or nitriles is suitable. The general formula for the catalysts claimed herein is $A_a V_b N_c X_d Z_e O_f$, where the symbols are as defined above. In one embodiment, the MMO is a promoted MMO, in which Z is present, preferably with a value of e from 0.001 to 0.1. Promoted MMO catalysts are described, e.g., in U.S. Pat. Nos. 6,825,380; 6,790,988; 6,700,015; 6,504,053 and 6,407,280. In another embodiment, Z is absent (e=0), in which case the MMO catalyst has the formula $A_a V_b N_c X_d O_f$.

Preferably, when a=1, b=0.1 to 0.5, c=0.05 to 0.5, d=0.01 to 0.5 and e=0.001 to 0.02. More preferably, when a=1, b=0.15 to 0.45, c=0.05 to 0.45, d=0.05 to 0.2 and e=0.005 to 0.015. However, in an alternative embodiment, when a=1 and e=0, b=0.01 to 1.0, c=0.01 to 1.0 and d=0.01 to 1.0; preferably, when a=1 and e=0, b=0.1 to 0.5, c=0.05 to 0.5 and d=0.01 to 0.5; more preferably, when a=1 and e=0, b=0.15 to 0.45, c=0.05 to 0.45 and d=0.05 to 0.2. Moreover, in a further alternative embodiment, e=0.005 to 0.1; more preferably, e=0.01 to 0.05. The value of f, i.e. the amount of oxygen present, is dependent on the oxidation state of the other elements in the catalyst. However, f is typically in the range of from 3 to 4.7. Preferably, A is Mo. Preferably, N is Te. Preferably, X is Nb or Ta; and most preferably, X is Nb. In one preferred embodiment of the invention, the catalyst is $Mo_a V_b Te_c Nb_d Z_e O_f$. Preferably, Z is Pd. In another embodiment of the invention, the catalyst is $Mo_a V_b Te_c Nb_d O_f$ (e=0).

The MMO catalyst is formed from an aqueous slurry or solution comprising solutions containing the MMO component metals. Water is removed by any suitable method, known in the art, to form a catalyst precursor. Such methods include, without limitation, vacuum drying, freeze drying, spray drying, rotary evaporation and air drying. Conditions for drying MMO catalysts are known and may be found in the patents cited above.

Once obtained, the catalyst precursor is calcined to form the MMO catalyst. The calcination may be conducted partially in an oxygen-containing atmosphere or in the substantial absence of oxygen, e.g., in an inert atmosphere or in vacuo. The inert atmosphere may be any material which is substantially inert, i.e., does not react or interact with, the catalyst precursor. Suitable examples include, without limitation, nitrogen, argon, xenon, helium or mixtures thereof. Preferably, the inert atmosphere is argon or nitrogen. The inert atmosphere may flow over the surface of the catalyst precursor or may not flow thereover (a static environment). When the inert atmosphere does flow over the surface of the catalyst precursor, the flow rate can vary over a wide range, e.g., at a space velocity of from 1 to 500 hr$^{-1}$.

The calcination is usually performed at a temperature of from 350° C. to 850° C. Preferably, the calcination is performed at least at 400° C., more preferably at least at 500° C. Preferably, the maximum calcination temperature is 750° C., more preferably 700° C. The calcination is performed for an amount of time suitable to form the aforementioned catalyst. Typically, the calcination is performed for from 0 to 72 hours, preferably from 0.5 to 25 hours, more preferably for from 0.5 to 6 hours, to obtain the desired promoted mixed metal oxide.

In a preferred mode of operation, the catalyst precursor is calcined in two stages. In the first stage, the catalyst precursor is calcined in an inert or oxidizing environment (e.g. air) at a temperature of from 200° C. to 330° C., preferably from 275° C. to 325° C. for from 15 minutes to 40 hours, preferably for from 0.5 to 6 hours. In the second stage, the material from the first stage is calcined in a non-oxidizing environment (e.g., an inert atmosphere) at a temperature of from 500° C. to 750° C., preferably for from 550° C. to 650° C., for 0 to 40 hours, preferably for from 1 to 3 hours. Optionally, a reducing gas, such as, for example, ammonia or hydrogen, may be added during the second stage calcination.

In a particularly preferred mode of operation, the catalyst precursor in the first stage is placed in the desired oxidizing atmosphere at room temperature and then raised to the first stage calcination temperature and held there for the desired first stage calcination time. The atmosphere is then replaced with the desired non-oxidizing atmosphere for the second stage calcination, the temperature is raised to the desired second stage calcination temperature and held there for the desired second stage calcination time.

Although any type of heating mechanism, e.g., a furnace, may be utilized during the calcination, it is preferred to conduct the calcination under a flow of the designated gaseous environment. Therefore, it is advantageous to conduct the calcination in a bed with continuous flow of the desired gas(es) through the bed of solid catalyst precursor particles.

In the present invention, the MMO is combined with water comprising 0-3% of a metal oxide precursor. When the water contains 0% metal oxide precursor, the water and the MMO are heated at a temperature of at least 60° C., preferably for at least 0.1 hour, more preferably for at least 1 hour. Preferably, the mixture is heated no more than 72 hours. More preferably, the temperature is at least 80° C., more preferably at least 90° C., and most preferably the water is heated to reflux.

When the water contains >0% metal oxide precursor, preferably, the MMO and the aqueous metal oxide precursor are in contact for at least 10 minutes, more preferably at least 20 minutes, preferably at a temperature at least 20° C. Preferably, the contact time is no more than 72 hours. In one embodiment of the invention, the MMO and the aqueous metal oxide precursor are heated for at least 0.1 hour, more preferably at least 1 hour. Preferably, the mixture is heated no more than 72 hours. Preferably, the temperature is at least 40° C., more preferably at least 50° C. Metals for use in the metal oxide precursor are Nb, Mo, V, W, Zr, Ta and Bi. Combinations of these metals may also be used, or combinations of one or more of these metals with other metals, e.g., Nb and Te. A metal oxide precursor is a metal-containing substance, e.g., metal complexes and metal salts, that can be oxidized or decomposed to form a metal oxide, e.g., by calcination.

Preferably, the added water is removed from the MMO after the water treatment step by evaporation, e.g., by reduced-pressure distillation, with or without heating, or by boiling at atmospheric pressure.

Preferably, the metal oxide precursor is combined with the MMO in an amount of at least 0.01% contained metal based on total weight of metals in the modified mixed metal oxide, more preferably at least 0.1%, more preferably at least 0.2%. The total amount of metal oxide precursor applied will be larger than these amounts due to the presence of anions, solvents, complexing agents, etc., but the amount of a particular precursor needed to produce the desired amount of metal can be calculated easily. Preferably, the metal oxide is present in an amount no more than 5% contained metal, more preferably no more than 2%, more preferably no more than 1.5%, and most preferably no more than 1.2%. The metal oxide is precursor is typically in a solution. For example, the precursor may be in a solution containing metal complexes or salts. Typically, forming a metal oxide from a mixed metal oxide precursor requires calcination of the treated MMO. The resulting material after calcination is referred to herein as the calcined modified mixed metal oxide.

Once obtained, the treated MMO is calcined. The calcination may be conducted partially in an oxygen-containing atmosphere or in the substantial absence of oxygen, e.g., in an inert atmosphere or in vacuo. The inert atmosphere may be any material which is substantially inert, i.e., does not react or interact with, the catalyst precursor. Suitable examples include, without limitation, nitrogen, argon, xenon, helium or mixtures thereof. Preferably, the inert atmosphere is argon or nitrogen. The inert atmosphere may flow over the surface of the catalyst precursor or may not flow thereover (a static environment). When the inert atmosphere does flow over the surface of the catalyst precursor, the flow rate can vary over a wide range, e.g., at a space velocity of from 1 to 500 $hr^{-1}$.

The calcination is usually performed at a temperature of from 250° C. to 850° C. Preferably, the calcination is performed at least at 300° C. Preferably, the maximum calcination temperature is 700° C., more preferably 650° C. The calcination is performed for an amount of time suitable to form the aforementioned catalyst. Typically, the calcination is performed for from 0 to 72 hours, preferably from 0.5 to 25 hours, more preferably for from 0.5 to 6 hours, to obtain the desired calcined modified mixed metal oxide.

In a preferred mode of operation, the catalyst precursor is calcined in two stages. In the first stage, the catalyst precursor is calcined in an inert or oxidizing environment (e.g. air) at a temperature of from 200° C. to 400° C., preferably from 275° C. to 325° C. for from 15 minutes to 40 hours, preferably for from 0.5 to 6 hours. In the second stage, the material from the first stage is calcined in a non-oxidizing environment (e.g., an inert atmosphere) at a temperature of from 400° C. to 750° C., preferably for from 450° C. to 650° C., for 0 to 40 hours, preferably for from 1 to 3 hours.

In a particularly preferred mode of operation, the catalyst precursor in the first stage is placed in the desired oxidizing atmosphere at room temperature and then raised to the first stage calcination temperature and held there for the desired first stage calcination time. The atmosphere is then replaced with the desired non-oxidizing atmosphere for the second stage calcination, the temperature is raised to the desired second stage calcination temperature and held there for the desired second stage calcination time.

Although any type of heating mechanism, e.g., a furnace, may be utilized during the calcination, it is preferred to conduct the calcination under a flow of the designated gaseous environment. Therefore, it is advantageous to conduct the calcination in a bed with continuous flow of the desired gas(es) through the bed of solid catalyst precursor particles.

The metal oxide may be ground at any point in the process, following or prior to any of the treatment steps. In a preferred embodiment, at least one of the calcined modified mixed metal oxide and the original mixed metal oxide is ground. Preferably, the surface area after grinding is from 5-30 $m^2/g$. Examples of suitable types of grinding apparatus include, e.g., a freezer/mill, ball mill, mortar and pestle, and jet mill.

In one preferred embodiment of the invention, the calcined modified mixed metal oxide or the original mixed metal oxide is treated with a solution of an acid. Preferably, a slurry is formed containing the acid solution and the metal oxide, and this slurry is heated, preferably to reflux, then cooled, and filtered to isolate the product, which preferably is washed with solvent. Suitable acids include, e.g., mineral acids (e.g., nitric acid, sulfuric acid, phosphoric acid, hydrochloric acid, perchloric acid, chloric acid and hypochlorous acid) and organic acids (preferably $C_1$-$C_6$ acids, e.g., oxalic acid, formic acid, acetic acid, citric acid and tartaric acid). Suitable solvents for acid treatment include, e.g., water and $C_1$-$C_3$ alcohols. Preferably, the solvent is water, methanol or a combination thereof, most preferably water. When the solvent comprises water, the acid treatment may be performed by heating with microwave radiation. Preferably, the solution of acid contains from 0.1% to 50% acid. Preferably, acid treatment is performed for at least 0.1 hour, more preferably at least 1 hour; preferably not more than 72 hours. Preferably, the temperature is at least 60° C., more preferably at least 90° C., and most preferably the acid solution and the calcined mixed metal oxide are heated to reflux. Especially preferred acids are oxalic acid and nitric acid.

The operations of treatment with water containing 0-3% metal oxide precursor, acid treatment, and grinding, may be performed in any order. One preferred order is: (1) treatment with water; (2) grinding; and (3) acid treatment. Another preferred order is: (1) grinding; (2) acid treatment; and (3) treatment with water.

EXAMPLES

In the following examples, unless otherwise noted, re-calcination temperature ramp rates were 5° C./min in air, and 2° C./min in Ar.

Acrylic acid yields were compared at a constant oxygen conversion of 85%. In the manufacture of acrylic acid from propane, it is desirable to maximize reactor productivity, to maximize selectivity to product, to avoid the creation of a flammable mixture of gases, and to maximize catalyst lifetime. To maximize productivity, concentrations of propane and oxygen in the reactor feed are increased. To maximize product yield, the concentration of water (steam) in the feed is increased. To avoid the creation of a flammable mixture of gases, the ratio of fuel to oxygen in the feed is controlled. To maximize catalyst lifetime, a minimal amount of oxygen is maintained in the reactor effluent. The net effect of the feed constraints is to require a feed mixture in which the ratio of propane to oxygen is nearly stoichiometric. That is, for conversion of propane to acrylic acid, the ratio is about 1:2.1. Since the formation of waste products (carbon oxides, acetic acid) requires a greater amount of oxygen, and their formation is unavoidable, oxygen becomes the limiting reagent in the reaction. For this reason, it is preferred to measure catalyst performance as yield of (or selectivity to) acrylic acid as a function of oxygen conversion, rather than propane conversion.

Comparative Example 1

Unground Catalyst

A catalyst of nominal composition $Mo_{1.0}V_{0.285}Te_{0.21}Nb_{0.17}Pd_{0.01}O_x$ was prepared in the following manner: an aqueous solution containing ammonium heptamolybdate tetrahydrate (35.7 g), ammonium metavanadate (6.7 g) and telluric acid (9.7 g) was formed by dissolving the corresponding salts in 200 ml of water at 70° C. Then 5 ml of concentrated nitric acid and an aqueous solution containing ammonium niobium oxalate (15.7 g, 20% Nb content), palladium nitrate hydrate (0.5 g), and oxalic acid (3.9 g) in 180 ml water were added thereto. After removing the water via a rotary evaporator at 50° C., the solid materials were further dried under vacuum overnight and then calcined. (Calcination was effected by placing the solid materials in an air atmosphere and then heating them to 275° C. at 10° C./min and holding them under the air atmosphere at 275° C. for one hour; the atmosphere was then changed to argon and the material was heated from 275° C. to 600° C. at 2° C./min and the material was held under the argon atmosphere at 600° C. for two hours.) After calcination, 40 g of solid material were obtained.

Water Treatment

This solid material was first sieved through 10 mesh sieve, and then stirred in 200 ml of water five hours. Again, the water was removed via a rotary evaporator at 50° C. and a black powder was obtained with a BET surface area of 6.5 m²/g. Several batches of this material were collected and combined. A portion of this material (10 g) was pressed and sieved to 14-20 mesh (0.85-1.40 mm) granules for reactor evaluation.

Comparative Example 2

Ground Catalyst

A catalyst prepared according to Comparative Example 1 (40 g) was ground with a Freezer/Mill (Model 6750 from Spex CertiPrep) and a BET surface area of 12 m²/g was obtained. Then 10 g of the ground catalyst were pressed and sieved to 14-20 mesh granules for reactor evaluation.

Comparative Example 3

Grinding and Heat Treatment

A catalyst prepared according to Comparative Example 2 (10 g) was placed in a quartz tube and heated first three hours in air at 300° C. and then two hours in argon at 500° C. The resulting material was pressed and sieved to 14-20 mesh for reactor evaluation.

Comparative Example 4

Water at Ambient Temperature and 500° C. Calcination

A catalyst prepared according to Comparative Example 1 (20 g) was stirred in water (50 g) for twenty minutes, and dried via a rotary evaporator at 50° C. The dried material was calcined first three hours in air at 300° C. and then two hours in argon at 500° C. This calcined material was ground with Freezer/Mill and then pressed and sieved to 14-20 mesh for reactor evaluation.

Example 1

0.25% Nb and 500° C. Calcination

A catalyst prepared according to Comparative Example 1 (10 g) was added to a solution of ammonium niobium oxalate (0.12 g) in 25 ml water. The resulting mixture was stirred for twenty minutes and dried via a rotary evaporator at 50° C. The dried materials were calcined first three hours in air at 300° C. and then two hours in argon at 500° C. This calcined material was ground with Freezer/Mill and then pressed and sieved to 14-20 mesh for reactor evaluation.

Comparative Example 5

0.5% Nb and 300° C. Calcination

A catalyst prepared according to Comparative Example 1 (30 g) was added to a solution of ammonium niobium oxalate (0.75 g) in 75 ml water. The resulting mixture was stirred for twenty minutes and dried via a rotary evaporator at 50° C. A portion of the dried material (10 g) was calcined three hours in air at 300° C. This calcined material was ground with Freezer/Mill and then pressed and sieved to 14-20 mesh for reactor evaluation.

Example 2

0.5% Nb and 500° C. Calcination

A portion of the dried material of Comparative Example 5 (20 g) was calcined first three hours in air at 300° C. and then two hours in argon at 500° C. This calcined material was ground with Freezer/Mill and then pressed and sieved to 14-20 mesh for reactor evaluation

Example 3

0.5% Te, 0.5% Nb and 300° C. Calcination

A catalyst prepared according to Comparative Example 1 (20 g) was added to a solution of telluric acid (0.18 g) and ammonium niobium oxalate (0.5 g) in 50 ml water. The resulting mixture was stirred for twenty minutes and dried via a rotary evaporator at 50° C. A portion of the dried material (10 g) was calcined three hours in air at 300° C. This calcined material was ground with Freezer/Mill and then pressed and sieved to 14-20 mesh for reactor evaluation.

Example 4

0.5% Te, 0.5% Nb and 500° C. Calcination

A portion (10 g) of the dried material of Example 3 was calcined first three hours in air at 300° C. and then two hours in argon at 500° C. This calcined material was ground with Freezer/Mill and then pressed and sieved to 14-20 mesh for reactor evaluation.

Example 5

0.5% Te, 0.25% Nb and 600° C. Calcination

A catalyst prepared according to Comparative Example 1 (60 g) was added to an aqueous solution of telluric acid (0.54 g) and ammonium niobium oxalate (0.75 g) in 100 ml water. The resulting mixture was stirred for twenty minutes and dried via a rotary evaporator at 50° C. The dried material was split into three portions. One portion (10 g) was calcined first three hours in air at 300° C. and then two hours in argon at 600° C. This calcined material was ground with Freezer/Mill and then pressed and sieved to 14-20 mesh for reactor evaluation.

Comparative Example 6

0.5% Te and 300° C. Calcination

A catalyst prepared according to Comparative Example 1 (20 g) was added to an aqueous solution of telluric acid (0.18 g) in 50 ml water. The resulting mixture was stirred for twenty minutes and dried via a rotary evaporator at 50° C. A portion of the dried material (10 g) was calcined three hours in air at 300° C. This calcined material was ground with Freezer/Mill (Model 6750 from Spex CertiPrep) and then pressed and sieved to 14-20 mesh for reactor evaluation.

Comparative Example 7

0.5% Te and 500° C. Calcination

A portion of the dried material of Comparative Example 6 (10 g) was calcined first three hours in air at 300° C. and then two hours in argon at 500° C. This calcined material was ground with Freezer/Mill and then pressed and sieved to 14-20 mesh for reactor evaluation.

Comparative Example 8

0.5% Mo and 300° C. Calcination

A catalyst prepared according to Comparative Example 1 (22 g) was added to an aqueous solution of ammonium heptamolybdate (0.20 g) in 50 ml water. The resulting mixture was stirred for twenty minutes and dried via a rotary evaporator at 50° C. A portion of the dried material (11 g) was calcined three hours in air at 300° C. The calcined materials were ground with Freezer/Mill and then pressed and sieved to 14-20 mesh for reactor evaluation.

Example 6

0.5% Mo and at 500° C. Calcination

A portion (11 g) of the dried material of Comparative Example 8 was calcined first three hours in air at 300° C. and then two hours in argon at 500° C. This calcined material was ground with Freezer/Mill and then pressed and sieved to 14-20 mesh for reactor evaluation.

Comparative Example 9

0.5% V and 300° C. Calcination

A catalyst prepared according to Comparative Example 1 (22 g) was added to an aqueous solution formed by dissolving ammonium metavanadate (0.25 g) in 100 ml water at 70° C. The resulting mixture was stirred for twenty minutes and dried via a rotary evaporator at 50° C. A portion of the dried material (12 g) was calcined three hours in air at 300° C. This calcined material was ground with Freezer/Mill and then pressed and sieved to 14-20 mesh for reactor evaluation.

Example 7

0.25% V and 500° C. Calcination

A catalyst prepared according to Comparative Example 1 (20 g) was mixed with a solution of 0.12 g ammonium metavanadate in 50 g water at 70° C. After stirring 20 minutes, the mixture was dried (rotavap) and calcined, first for three hours in air at 300° C., and then for two hours in argon at 500° C. This calcined material was ground with Freezer/Mill and then pressed and sieved to 14-20 mesh for reactor evaluation.

Comparative Example 10

1.0% W and 300° C. Calcination

A catalyst prepared according to Comparative Example 1 (33 g) was added to an aqueous solution of ammonium tungstate (0.45 g) in 75 ml water. The resulting mixture was stirred for twenty minutes and dried via a rotary evaporator at 50° C. A portion of the dried material (11 g) was calcined three hours in air at 300° C. This calcined material was ground with Freezer/Mill and then pressed and sieved to 14-20 mesh for reactor evaluation.

Example 8

1.0% W and 500° C. Calcination

A portion of the dried material of Comparative Example 10 (22 g) was calcined first three hours in air at 300° C. and then two hours in argon at 500° C. This calcined material was ground with a Freezer/Mill and then pressed and sieved to 14-20 mesh for reactor evaluation.

Comparative Example 11

0.5% Zr and 500° C. Calcination

A catalyst prepared according to Comparative Example 1 (22 g) was added to an aqueous solution of zirconyl nitrate (0.28 g) in 50 ml water. The resulting mixture was stirred for twenty minutes and dried via a rotary evaporator at 50° C. A portion of the dried material (11 g) was calcined three hours in air at 300° C. and then two hours in argon at 500° C. This calcined material was ground with a Freezer/Mill and then pressed and sieved to 14-20 mesh for reactor evaluation.

Comparative Example 12

1.0% Ta and 500° C. Calcination

A catalyst prepared according to Comparative Example 1 (30 g) was added to a solution of tantalum oxalate prepared by mixing tantalum oxalate solution from H.C. Starck (175 g $Ta_2O_{5/1,\ 2.1}$ ml) in 50 ml water. The resulting mixture was stirred for twenty minutes and dried via a rotary evaporator at 50° C. The dried material was calcined in air at 300° C. for three hours, then in argon at 500° C. for two hours. This calcined material was ground with Freezer/Mill and then pressed and sieved to 14-20 mesh for reactor evaluation.

Comparative Example 13

1.0% Bi and 500° C. Calcination

A catalyst prepared according to Comparative Example 1 (20 g) was added to a solution of bismuth nitrate pentahydrate (0.465 g) in 50 g 5% aqueous nitric acid. The resulting mixture was stirred for twenty minutes and dried via a rotary evaporator at 50° C. The dried material was calcined in air at 300° C. for three hours, then in argon at 500° C. for two hours. This calcined material was ground with Freezer/Mill and then pressed and sieved to 14-20 mesh for reactor evaluation.

Comparative Example 14

0.5% Ti and 500° C. Calcination

A catalyst prepared according to Comparative Example 1 (22 g) was added to an aqueous solution of ammonium titanyl oxalate (0.67 g) in 50 ml water. The resulting mixture was stirred for thirty minutes and dried via a rotary evaporator at 50° C. The dried materials were calcined first three hours in air at 300° C. and then two hours in argon at 550° C. This calcined material was ground with Freezer/Mill and then pressed and sieved to 14-20 mesh for reactor evaluation.

Comparative Example 15

0.5% Ga and 550° C. Calcination

A catalyst prepared according to Comparative Example 1 (30 g) was added to an aqueous solution of gallium nitrate hydrate (0.67 g) in 50 ml water. The resulting mixture was stirred for thirty minutes and dried via a rotary evaporator at 50° C. The dried materials were calcined first three hours in air at 300° C. and then two hours in argon at 550° C. This calcined material was ground with Freezer/Mill and then pressed and sieved to 14-20 mesh for reactor evaluation.

Comparative Example 16

0.5% Ni and 550° C. Calcination

A catalyst prepared according to Comparative Example 1 (22 g) was added to an aqueous solution of nickel nitrate hydrate (0.54 g) in 50 ml water. The resulting mixture was stirred for thirty minutes and dried via a rotary evaporator at 50° C. The dried materials were calcined first three hours in air at 300° C. and then two hours in argon at 550° C. This calcined material was ground with Freezer/Mill and then pressed and sieved to 14-20 mesh for reactor evaluation.

Comparative Example 17

0.5% Cs and 550° C. Calcination

A catalyst prepared according to Comparative Example 1 (30 g) was added to an aqueous solution of cesium nitrate (0.22 g) in 100 ml water. The resulting mixture was stirred for thirty minutes and dried via a rotary evaporator at 50° C. The dried materials were calcined first three hours in air at 300° C. and then two hours in argon at 550° C. This calcined material was ground with Freezer/Mill and then pressed and sieved to 14-20 mesh for reactor evaluation.

Comparative Example 18

0.5% Cr and 500° C. Calcination

A catalyst prepared according to Comparative Example 1 (22 g) was added to an aqueous solution of chromium nitrate nonahydrate (0.85 g) in 50 ml water. The resulting mixture was stirred for thirty minutes and dried via a rotary evaporator at 50° C. The dried materials were calcined first three hours in air at 300° C. and then two hours in argon at 500° C. This calcined material was ground with Freezer/Mill and then pressed and sieved to 14-20 mesh for reactor evaluation.

Comparative Example 19

0.5% P and 500° C. Calcination

A catalyst prepared according to Comparative Example 1 (30 g) was added to an aqueous solution of $(NH_4)_2HPO_4$ (0.64 g) in 75 ml water. The resulting mixture was stirred for thirty minutes and dried via a rotary evaporator at 50° C. The dried materials were calcined first three hours in air at 300° C. and then two hours in argon at 500° C. This calcined material was ground with Freezer/Mill and then pressed and sieved to 14-20 mesh for reactor evaluation.

Comparative Example 20

0.5% Sb and 500° C. Calcination

A catalyst prepared according to Comparative Example 1 (20 g) was added to an aqueous solution of hydrogen antimony tartrate (50 ml, 0.20% Sb) prepared by ion-exchanging as solution of potassium antimony tartrate. The resulting mixture was stirred for thirty minutes and dried via a rotary evaporator at 50° C. The dried materials were calcined first three hours in air at 300° C. and then two hours in argon at 500° C. This calcined material was ground with Freezer/Mill and then pressed and sieved to 14-20 mesh for reactor evaluation.

Comparative Example 21

0.5% Si and 500° C. Calcination

A catalyst prepared according to Comparative Example 1 (22 g) was added to a solution of tetraethyl orthosilicate (0.81 g) in 100 ml water. The resulting mixture was stirred for thirty minutes and dried via a rotary evaporator at 50° C. The dried materials were calcined first three hours in air at 300° C. and then two hours in argon at 500° C. This calcined material was ground with Freezer/Mill and then pressed and sieved to 14-20 mesh for reactor evaluation.

Comparative Example 22

Grinding and OA Extraction

A catalyst prepared according to Comparative Example 2 (10 g) was added to 100 g of 2% aqueous oxalic acid and refluxed five hours. The solid was collected by gravity filtration and dried under vacuum overnight. The dried material was pressed and sieved to 14-20 mesh granules for reactor evaluation.

Comparative Example 23

Water at Ambient Temperature and 500° C. Calcination, OA Extraction)

A catalyst prepared according to Comparative Example 4 (10 g) was added to 100 g of 1% aqueous oxalic acid and refluxed three hours. The solid was collected by vacuum filtration and dried. The dried material was pressed and sieved to 14-20 mesh granules for reactor evaluation.

Example 9

0.5% Te, 0.25% Nb, 500° C. Calcination, Grinding, and OA-$H_2O$ Extraction

A catalyst prepared according to Comparative Example 1 (60 g) was added to a solution of telluric acid (0.54 g) and ammonium niobium oxalate (0.75 g) in 100 ml water. The resulting mixture was stirred for twenty minutes and dried via a rotary evaporator at 50° C. The dried material was split into three portions. One portion (10 g) was calcined first three hours in air at 300° C. and then two hours in argon at 500° C. This calcined material was ground with Freezer/Mill and then added to 100 g of 2% aqueous oxalic acid and refluxed three hours. The solid was collected by gravity filtration and dried. The dried material was pressed and sieved to 14-20 mesh granules for reactor evaluation.

Example 10

0.5% Te, 0.5% Nb, 500° C. Calcination, Grinding, and OA-$H_2O$ Extraction Under Microwave Irradiation A catalyst prepared according to Comparative Example 1 (30 g) was added to a solution of telluric acid (0.27 g) and ammonium niobium oxalate (0.75 g) in 75 ml water. The resulting mixture was stirred for twenty minutes and dried via a rotary evaporator at 50° C. The dried material was split into three portions. One portion (10 g) was calcined first three hours in air at 300° C. and then two hours in argon at 500° C. This calcined material was ground with Freezer/Mill and then extracted using a Microwave Accelerated Reaction System, Model MARS 5®, from CEM. The material was heated in a microwave 100 ml vessel which was filled with 50 g of a mixture of a 1% oxalic acid in water solution (45 g) and the catalyst (5 g). The extraction was carried out using 100% power, 600W, a ramp rate of 10 minutes to 125° C. with a hold period of 50 minutes with medium stirring. The solid was then collected by gravity filtration and dried in a vacuum oven overnight. The dried material was pressed and sieved to 14-20 mesh granules for reactor evaluation.

Example 11

0.5% Te, 0.5% Nb, 500° C. Calcination, Grinding, and OA-$H_2O$ Extraction

A catalyst prepared according to Comparative Example 1 (33 g) was added to a solution of telluric acid (0.30 g) and ammonium niobium oxalate (0.83 g) in 70 ml water. The resulting mixture was stirred for twenty minutes and dried via a rotary evaporator at 50° C. The dried material was split into three portions. One portion (21 g) was calcined first three hours in air at 300° C. and then two hours in argon at 500° C. This calcined material was added to a solution of 1.0 g oxalic acid in 99 g water and refluxed three hours. The solid was collected by gravity filtration and dried. This material was pressed and sieved to 14-20 mesh granules for reactor evaluation.

Example 12

0.5% Te, 0.25% Nb, 500° C. Calcination, Grinding, and OA-MeOH Extraction

A catalyst prepared according to Comparative Example 1 (43 g) was added to a solution of telluric acid (0.39 g) and ammonium niobium oxalate (0.55 g) in 110 ml water. The resulting mixture was stirred for thirty minutes and dried via a rotary evaporator at 50° C. The dried material was calcined first three hours in air at 300° C. and then two hours in argon at 500° C. One portion (10 g) of this calcined material was added to a solution of 1.2 g oxalic acid in 100 ml methanol and refluxed three hours. The solid was collected by gravity filtration and dried. The dried material was heated five hours at 400° C. in argon. This material was pressed and sieved to 14-20 mesh granules for reactor evaluation.

Example 13

0.5% Nb, 500° C. Calcination, Grinding, and OA-$H_2O$ Extraction a Under Microwave Irradiation A catalyst prepared according to Comparative Example 1 (36 g) was added to a solution of ammonium niobium oxalate (0.90 g) in 75 ml water. The resulting mixture was stirred for twenty minutes and dried via a rotary evaporator at 50° C. The dried materials were calcined first three hours in air at 300° C. and then two hours in argon at 500° C. This calcined material was ground with Freezer/Mill, extracted according to the procedure in Example 10, and pressed and sieved to 14-20 mesh for reactor evaluation.

Example 14

0.5% Nb by Incipient Wetness, 500° C. Calcination, Grinding, and OA-H$_2$O Extraction Ammonium niobium oxalate (12.5 g) was dissolved in 400 ml water. A catalyst prepared according to Comparative Example 1 (20 g) was placed in a 100 ml plastic beaker, and 12 ml of the ammonium niobium oxalate solution was added dropwise to saturate the solid. The saturated solid was dried overnight under vacuum at room temperature, and then calcined first three hours in air at 300° C. and then two hours in argon at 500° C. This calcined material was ground with Freezer/Mill, and then 10 g were mixed with 1 g of oxalic acid in 100 g water and refluxed three hours. The solid was collected by gravity filtration and dried. This material was pressed and sieved to 14-20 mesh granules for reactor evaluation.

Example 15

0.5% Nb Dried at Ambient Pressure, 500° C. Calcination, Grinding, and OA-H$_2$O Extraction A catalyst prepared according to Comparative Example 1 (20 g) was added to a solution of ammonium niobium oxalate (0.5 g) in 50 ml water. The resulting mixture was boiled on a hot plate until dry. The dried materials were calcined first three hours in air at 300° C. and then two hours in argon at 500° C. This material was ground with a Freezer/Mill and then 10 g was mixed with 1 g of oxalic acid in 100 g water and refluxed three hours. The solid was collected by gravity filtration and dried. It was pressed and sieved to 14-20 mesh for reactor evaluation.

Example 16

0.5% Mo, 500° C. Calcination, Grinding, and OA-H$_2$O Extraction

A catalyst prepared according to Comparative Example 1 (30 g) was added to a solution of ammonium heptamolybdate (0.28 g) in 50 ml water. The resulting mixture was stirred for twenty minutes and dried via a rotary evaporator at 50° C. The dried materials were calcined first three hours in air at 300° C. and then two hours in argon at 500° C. This material was ground with a Freezer/Mill and then 10 g was mixed with 1 g of oxalic acid in 100 g water and refluxed three hours. The solid was collected by gravity filtration and dried. It was pressed and sieved to 14-20 mesh for reactor evaluation.

Example 17

0.25% V, 500° C. Calcination, Grinding, and OA-H$_2$O Extraction

A catalyst prepared according to Comparative Example 1 (20 g) was added to a solution of ammonium metavanadate (0.12 g) in 50 ml water. The resulting mixture was stirred for twenty minutes and dried via a rotary evaporator at 50° C. The dried materials were calcined first three hours in air at 300° C. and then two hours in argon at 500° C. This material was ground with a Freezer/Mill and then 10 g was mixed with 1 g of oxalic acid in 100 g water and refluxed three hours. The solid was collected by gravity filtration and dried. It was pressed and sieved to 14-20 mesh for reactor evaluation.

Example 18

0.5% V by Incipient Wetness, 500° C. Calcination, Grinding, and OA-H$_2$O Extraction Vanadyl sulfate (0.89 g) was dissolved in 50 ml water. A catalyst prepared according to Comparative Example 1 (20 g) was placed in a 100 ml plastic beaker, and 12 ml of the vanadyl sulfate solution was added dropwise to saturate the solid. The saturated solid was dried overnight under vacuum at room temperature, and then calcined first three hours in air at 300° C. and then two hours in argon at 500° C. This calcined material was ground with Freezer/Mill, and then 10 g were mixed with 1 g of oxalic acid in 100 g water and refluxed three hours. The solid was collected by gravity filtration and dried. This material was pressed and sieved to 14-20 mesh granules for reactor evaluation.

Example 19

1% W, 500° C. Calcination, Grinding, and OA-H$_2$O Extraction Under Microwave Irradiation A catalyst prepared according to Comparative Example 1 (22 g) was added to a solution of ammonium tungstate (0.30 g) in 50 ml water. The resulting mixture was stirred for twenty minutes and dried via a rotary evaporator at 50° C. The dried materials were calcined first three hours in air at 300° C. and then two hours in argon at 500° C. This calcined material was ground with Freezer/Mill, extracted according to the procedure in Example 10, and pressed and sieved to 14-20 mesh for reactor evaluation.

Example 20

0.5% Zr, 500° C. Calcination, Grinding, and OA-H$_2$O Extraction Under Microwave Irradiation A catalyst prepared according to Comparative Example 1 (22 g) was added to a solution of zirconyl nitrate (0.28 g) in 50 ml water. The resulting mixture was stirred for twenty minutes and dried via a rotary evaporator at 50° C. The dried materials were calcined first three hours in air at 300° C. and then two hours in argon at 500° C. This calcined material was ground with Freezer/Mill, extracted according to the procedure in Example 10, and pressed and sieved to 14-20 mesh for reactor evaluation.

Example 21

1% Ta, 500° C. Calcination, Grinding, and OA-H$_2$O Extraction Under Microwave Irradiation A catalyst prepared according to Comparative Example 1 (30 g) was added to a solution of tantalum oxalate prepared by mixing tantalum oxalate solution from H. C. Starck (175 g Ta2O$_5$/l, 2.1 ml) in 50 ml water. The resulting mixture was stirred for twenty minutes and dried via a rotary evaporator at 50° C. The dried materials were calcined first three hours in air at 300° C. and then two hours in argon at 500° C. This calcined material was ground with Freezer/Mill, extracted according to the procedure in Example 10, and pressed and sieved to 14-20 mesh for reactor evaluation.

Example 22

1% Bi, 500° C. Calcination, Grinding, and OA-H$_2$O Extraction

A catalyst prepared according to Comparative Example 1 (30 g) was added to a solution of bismuth nitrate prepared by dissolving 0.465 g bismuth nitrate pentahydrate in 50 g 5% aq. nitric acid. The resulting mixture was stirred for twenty minutes and dried via a rotary evaporator at 50° C. The dried materials were calcined first three hours in air at 300° C. and then two hours in argon at 500° C. This calcined material was ground with Freezer/Mill, and then 10 g were mixed with 1 g of oxalic acid in 100 g water and refluxed three hours. The solid was collected by gravity filtration and dried. This material was pressed and sieved to 14-20 mesh granules for reactor evaluation.

Example 23

No Water Treatment, 0.5% Nb, 500° C. Dried at Ambient Pressure, Calcination, Grinding, and OA-H$_2$O Extraction)

A catalyst prepared according to Comparative Example 1, but without the water treatment (20 g), was added to a solution of ammonium niobium oxalate (0.5 g) in 50 ml water. The resulting mixture was boiled on a hot plate until dry. The dried materials were calcined first three hours in air at 300° C. and then two hours in argon at 500° C. This material was ground with a Freezer/Mill and then 10 g was mixed with 1 g of oxalic acid in 100 g water and refluxed three hours. The solid was collected by gravity filtration and dried. It was pressed and sieved to 14-20 mesh for reactor evaluation.

Example 24

0.5% Nb, 500° C. Ar Only, Calcination, Grinding, and OA-H$_2$O Extraction

A catalyst prepared according to Comparative Example 1, but without the water treatment (10 g), was added to a solution of ammonium niobium oxalate (0.25 g) in 25 ml water. The resulting mixture was stirred for twenty minutes and dried via a rotary evaporator at 50° C. The dried materials were calcined two hours in argon at 500° C. This material was ground with a Freezer/Mill and then 10 g was mixed with 1 g of oxalic acid in 100 g water and refluxed three hours. The solid was collected by gravity filtration and dried. It was pressed and sieved to 14-20 mesh for reactor evaluation.

Example 25

0.5% Nb, 300° C. Ar Only, Calcination, Grinding, and OA-H$_2$O Extraction

A catalyst was prepared according to Example 24, except that calcination was carried out for two hours at 300° C.

Comparative Example 24

0.5% Nb, 300° C. Ar Only, Calcination, Grinding, and OA-H$_2$O Extraction

A catalyst was prepared according to Example 25.

Comparative Example 25

Reflux in Water, Dry, 500° C.

A catalyst prepared according to Comparative Example 1 (20 g) was heated at reflux in water (100 g) for five hours, and dried via a rotary evaporator at 50° C. The dried material was calcined first three hours in air at 300° C. and then two hours in argon at 500° C. This calcined material was ground with Freezer/Mill and then pressed and sieved to 14-20 mesh for reactor evaluation.

Example 26

Reflux in Water, Dry, 500° C., Grind, OA Extraction

A catalyst prepared according to Comparative Example 1 (20 g) was heated at reflux in water (100 g) for five hours, and dried via a rotary evaporator at 50° C. The dried material was calcined first three hours in air at 300° C. and then two hours in argon at 500° C. This calcined material was ground with Freezer/Mill and then pressed and sieved to 14-20 mesh. The ground catalyst (10 g) was added to 100 g of 1% aqueous oxalic acid and refluxed three hours. The solid was collected by vacuum filtration and dried. The dried material was pressed and sieved to 14-20 mesh granules for reactor evaluation.

Comparative Example 26

Reflux in Water, Filter

A catalyst prepared according to Comparative Example 1 (20 g) was heated at reflux in water (100 g) for five hours, collected by vacuum filtration, and dried in vacuo at room temperature. The dried material was calcined first three hours in air at 300° C. and then two hours in argon at 500° C. This calcined material was ground with Freezer/Mill and then pressed and sieved to 14-20 mesh for reactor evaluation.

Example 27

Reflux in Water, Filter, OA Extraction

A catalyst prepared according to Comparative Example 1 (20 g) was heated at reflux in water (100 g) for five hours, collected by vacuum filtration, and dried in vacuo at room temperature. The dried material was calcined first three hours in air at 300° C. and then two hours in argon at 500° C. This calcined material was ground with Freezer/Mill and then pressed and sieved to 14-20 mesh. The ground catalyst (10 g) was added to 100 g of 1% aqueous oxalic acid and refluxed three hours. The solid was collected by vacuum filtration and dried. The dried material was pressed and sieved to 14-20 mesh granules for reactor evaluation.

Comparative Example 27

Filtrate and 500° C. Calcination

A catalyst prepared according to Comparative Example 1 (20 g) was added to an aqueous solution of ammonium niobium oxalate (0.06 g) in 50 ml water. The resulting mixture was stirred for twenty minutes and dried via a rotary evaporator at 50° C. The dried materials were calcined first three hours in air at 300° C. and then two hours in argon at 500° C. This material (10 g) was ground with a Freezer/Mill, added to 100 g of 1% aqueous oxalic acid, and refluxed three hours. The solid was separated by filtration. The filtrate was labeled solution A.

A catalyst prepared according to Comparative Example 1 (20 g) was added to 60 g of the above filtrate (solution A), stirred for twenty minutes, and dried via a rotary evaporator at 50° C. The dried material was calcined first three hours in air at 300° C. and then two hours in argon at 500° C. This calcined material was ground with Freezer/Mill and then pressed and sieved to 14-20 mesh for reactor evaluation.

Example 28

Filtrate and 500° C. Calcination, OA Extraction

A catalyst prepared according to Comparative Example 1 (20 g) was added to an aqueous solution of ammonium niobium oxalate (0.06 g) in 50 ml water. The resulting mixture was stirred for twenty minutes and dried via a rotary evaporator at 50° C. The dried materials were calcined first three hours in air at 300° C. and then two hours in argon at 500° C. This material (10 g) was ground with a Freezer/Mill, added to 100 g of 1% aqueous oxalic acid, and refluxed three hours. The solid was separated by filtration. The filtrate was labeled solution A.

A catalyst prepared according to Comparative Example 1 (20 g) was added to 60 g of the above filtrate (solution A), stirred for twenty minutes, and dried via a rotary evaporator at 50° C. The dried material was calcined first three hours in air at 300° C. and then two hours in argon at 500° C. This calcined material was ground with Freezer/Mill and then pressed and sieved to 14-20 mesh. The ground catalyst (10 g) was added to 100 g of 1% aqueous oxalic acid and refluxed three hours. The solid was collected by vacuum filtration and dried. The dried material was pressed and sieved to 14-20 mesh granules for reactor evaluation.

Example 29

0.01% Nb and 500° C. Calcination

A catalyst prepared according to Comparative Example 1 (20 g) was added to a solution of ammonium niobium oxalate (0.01 g) in 50 ml water. The resulting mixture was stirred for twenty minutes at room temperature and dried via a rotary evaporator at 50° C. A portion of the dried material (10 g) was calcined three hours in air at 300° C., then two hours in argon at 500° C. A portion of this calcined material was ground with Freezer/Mill and then pressed and sieved to 14-20 mesh for reactor evaluation.

Example 30

0.01% Nb, 500° C. Calcination, and OA-H$_2$O Extraction

The unground portion of the material of Example A (10 g) was ground with Freezer/Mill and then mixed with 1 g of oxalic acid in 100 g water and refluxed three hours. The solid was collected by gravity filtration and dried. It was pressed and sieved to 14-20 mesh for reactor evaluation.

Example 31

Grinding, OA-H$_2$O Extraction, and then 0.5% Te, 0.25% Nb

A catalyst of nominal composition $Mo_{1.0}V_{0.25}Te_{0.17}Nb_{0.14}O_x$ was prepared in the following manner: an aqueous solution containing ammonium heptamolybdate tetrahydrate (30.0 g), ammonium metavanadate (4.92 g) and telluric acid (6.45 g) was formed by dissolving the corresponding salts in 200 ml of water at 70° C. Then 5 ml of concentrated nitric acid and an aqueous solution containing ammonium niobium oxalate (10.5 g), and oxalic acid (3.3 g) in 100 ml water were added thereto. After removing the water via a rotary evaporator at 50° C., the solid materials were further dried under vacuum overnight and then calcined. (Calcination was effected by placing the solid materials in an air atmosphere and then heating them to 275° C. at 10° C./min and holding them under the air atmosphere at 275° C. for one hour; the atmosphere was then changed to nitrogen and the material was heated from 275° C. to 600° C. at 2° C./min and the material was held under the nitrogen atmosphere at 600° C. for two hours.)

A portion (10.0 g) of the calcined catalyst was ground by shaking for 30 minutes with two 12-mm zirconia spheres in a solution of 0.10 g oxalic acid dihydrate in 9.9 g water on a SPEX 8000 Mixer Mill. This was repeated two more times.

A portion (20.0 g) of the ground catalyst was mixed with 2 g of oxalic acid in 98 g water and refluxed five hours. The solid was collected by filtration and dried.

A portion (10.0 g) of the oxalic acid treated catalyst was added to a solution of telluric acid (0.09 g) and ammonium niobium oxalate (0.13 g) in 25 ml water. The resulting mixture was stirred for three hours and dried via a rotary evaporator at 50° C. The dried material was calcined three hours in air at 300° C., then two hours in nitrogen at 500° C.

Evaluation Results

Granules (4 cc) were packed into a stainless steel reactor for the gas phase oxidation of propane. The reactor was heated with an electric furnace and fed with a mixture of propane, air and steam having a feed composition of 7% propane, 71% air and 22% steam. The effluent of the reactor was analyzed by gas chromatography to determine the propane conversion and the yield of acrylic acid. The results are shown in the following tables.

TABLE 1

| Sample | Treatment | re-calcination temperature (° C.) | Yield (%) of acrylic acid at 85% oxygen conversion |
|---|---|---|---|
| Comparative Example 1 | unground | | 53 |
| Comparative Example 2 | ground | | 54 |
| Comparative Example 3 | ground | 500 | 54 |
| Comparative Example 4 | water | 500 | 56 |
| Example 1 | 0.25% Nb | 500 | 58 |
| Comparative Example 5 | 0.5% Nb | 300 | 54 |
| Example 2 | 0.5% Nb | 500 | 57 |
| Example 3 | 0.5% Te 0.5% Nb | 300 | 57 |
| Example 4 | 0.5% Te 0.5% Nb | 500 | 59 |
| Example 5 | 0.5% Te 0.25% Nb | 600 | 57 |
| Comparative Example 6 | 0.5% Te | 300 | 54 |
| Comparative Example 7 | 0.5% Te | 500 | 53 |
| Comparative Example 8 | 0.5% Mo | 300 | 53 |

TABLE 1-continued

| Sample | Treatment | re-calcination temperature (° C.) | Yield (%) of acrylic acid at 85% oxygen conversion |
|---|---|---|---|
| Example 6 | 0.5% Mo | 500 | 57 |
| Comparative Example 9 | 0.5% V | 300 | 45 |
| Example 7 | 0.25% V | 500 | 57 |
| Comparative Example 10 | 1.0% W | 300 | 54 |
| Example 8 | 1.0% W | 500 | 57 |
| Comparative Example 11 | 0.5% Zr | 500 | 56 |
| Comparative Example 12 | 0.5% Ta | 500 | 56 |
| Comparative Example 13 | 1.0% Bi | 500 | 55 |
| Comparative Example 14 | 0.5% Ti | 500 | 55 |
| Comparative Example 15 | 0.5% Ga | 550 | 56 |
| Comparative Example 16 | 0.5% Ni | 550 | 54 |
| Comparative Example 17 | 0.5% Cs | 550 | 54 |
| Comparative Example 18 | 0.5% Cr | 500 | 50 |
| Comparative Example 19 | 0.5% P | 500 | 50 |
| Comparative Example 20 | 0.5% Sb | 500 | 56 |
| Comparative Example 21 | 0.5% Si | 500 | 55 |
| Example 29 | 0.01% Nb | 500 | 58 |

TABLE 2

| Sample | Treatment | re-calcination temperature (° C.) | Extracted ? | Yield (%) of acrylic acid at 85% oxygen conversion |
|---|---|---|---|---|
| Comparative Example 22 | ground | | yes | 56 |
| Comparative Example 23 | water | 500 | yes | 57 |
| Example 9 | 0.5% Te 0.25% Nb | 500 | yes | 59 |
| Example 10 | 0.5% Te 0.5% Nb | 500 | yes | 58 |
| Example 11 | 0.5% Te 0.5% Nb | 500 | yes | 59 |
| Example 12 | 0.5% Te 0.25% Nb | 500 | yes | 60 |
| Example 13 | 0.5% Nb | 500 | yes | 59 |
| Example 14 | 0.5% Nb | 500 | yes | 59 |
| Example 15 | 0.5% Nb | 500 | yes | 58 |
| Example 16 | 0.5% Mo | 500 | yes | 59 |
| Example 17 | 0.25% V | 500 | yes | 59 |
| Example 18 | 0.5% V | 500 | yes | 58 |
| Example 19 | 1.0% W | 500 | yes | 58 |
| Example 20 | 0.5% Zr | 500 | yes | 58 |
| Example 21 | 1.0% Ta | 500 | yes | 58 |
| Example 22 | 1% Bi | 500 | yes | 58 |
| Example 23 | 0.5% Nb | 500 | yes | 59 |
| Example 24 | 0.5% Nb | 500 | yes | 59 |
| Example 25 | 0.5% Nb | 300 | yes | 59 |
| Comparative Example 24 | 0.5% Nb | 300 | yes | 56 |
| Comparative Example 25 | water | 500 | no | 55 |
| Example 26 | water | 500 | yes | 60 |
| Comparative Example 26 | water | 500 | no | 53 |
| Example 27 | water | 500 | yes | 59 |
| Comparative Example 27 | filtrate | 500 | no | 56 |
| Example 28 | filtrate | 500 | yes | 60 |
| Example 30 | 0.01% Nb | 500 | yes | 58 |
| Example 31 | 0.5% Te 0.25% Nb | 500 | yes | 60 |

The invention claimed is:

1. A method for producing a catalyst by steps of:

(a) providing a mixed metal oxide having the empirical formula $$A_a V_b N_c X_d Z_e O_f$$

wherein A is at least one element selected from the group consisting of Mo and W, N is at least one element selected from the group consisting of Te and Sb, X is at least one element selected from the group consisting of Nb, Ta, Ti, Al, Zr, Cr, Mn, Fe, Ru, Co, Rh, Ni, Pt, Sb, Bi, B, In, As, Ge, Sn, Hf, Pb, P, Pm, Eu, Gd, Dy, Ho, Er, Tm, Yb and Lu, and Z is at least one element selected from the group consisting of Zn, Ga, Ir, Sm, Pd, Au, Ag, Cu, Sc, Y, Pr, Nd and Tb; and wherein, when a=1, b=0.01 to 1.0, c=0.01 to 1.0, d=0.01 to 1.0, e=0 to 0.1 and f is dependent on the oxidation state of the other elements;

(b) contacting the mixed metal oxide with water comprising 0.01-3% of a metal oxide precursor, based on contained metal as a percentage of total weight of metals in the mixed metal oxide and the metal oxide precursor, to form a modified mixed metal oxide; wherein the metal oxide precursor comprises at least one of Nb, Mo, V, W, Zr, Ta and Bi; and (c) calcining the modified mixed metal oxide to form a calcined modified mixed metal oxide.

2. The method of claim 1 in which the mixed metal oxide has formula $Mo_a V_b Te_c Nb_d Z_e O_f$, wherein e is 0.001 to 0.1.

3. The method of claim 2 in which Z is Pd.

4. The method of claim 1 further comprising a step of grinding the mixed metal oxide or the modified mixed metal oxide.

5. The method of claim 4 further comprising a step of heating the mixed metal oxide or the modified mixed metal oxide with an acid.

6. The method of claim 5 in which the steps of (i) contacting the mixed metal oxide with water comprising 0.01-3% of a metal oxide precursor; (ii) heating the mixed metal oxide or the modified mixed metal oxide with an acid; and (iii) grinding the mixed metal oxide or the modified mixed metal oxide; are performed in order (i) then (iii) then (ii), or (iii) then (ii) then (i).

7. The method of claim 1 in which the metal oxide precursor is added in an amount from 0.1% to 2% contained metal based on total weight of metals.

8. The method of claim 1 in which surface area of the calcined modified mixed metal oxide is from 5-30 m²/g.

9. The method of claim 1 in which the modified mixed metal oxide is calcined at least at 250° C.

10. The method of claim 1 in which the metal oxide precursor is added in an amount from 0.2% to 2% contained metal based on total weight of metals.

* * * * *